United States Patent [19]
Herzig

[11] Patent Number: 4,562,359
[45] Date of Patent: Dec. 31, 1985

[54] SWITCHING ARRANGEMENT FOR ELECTRICAL INSTALLATIONS

[75] Inventor: Peter Herzig, Aarau, Austria

[73] Assignee: BBC Brown, Boveri & Company, Limited, Baden, Switzerland

[21] Appl. No.: 544,790

[22] Filed: Oct. 24, 1983

[30] Foreign Application Priority Data

Nov. 1, 1982 [CH] Switzerland .......................... 6340/82

[51] Int. Cl.⁴ ........................................... H01H 47/00
[52] U.S. Cl. .................... 307/113; 307/115; 307/147; 361/189; 361/191
[58] Field of Search ............... 307/112, 113, 115, 116, 307/130, 140, 147; 361/189, 191, 62; 340/825.06, 825.16, 825.18, 644

[56] References Cited

U.S. PATENT DOCUMENTS 3,748,540  7/1973  Eggenberger et al. ......... 361/189 X
4,480,193 10/1984  Blahous et al. .................... 361/62 X
4,507,703  3/1985  Blau et al. ........................ 307/116 X Primary Examiner—A. D. Pellinen
Assistant Examiner—Derek S. Jennings
Attorney, Agent, or Firm—Burns, Doane, Swecker & Mathis

[57] ABSTRACT

In a protective circuit layout for a high voltage switchgear installation the switching position of the high voltage switches is detected by position signal contacts (for example Q81NCR, Q81NCS, Q81NCT). The status signals emitted by the position signal contacts of a group of switches (Q81, Q82, Q83, Q0) serve in a logic combination to monitor the command path of a switch (Q91) not belonging to the group. Each of the switches (for example Q91) is provided with a modularizable release unit with an inlet part (FEQ91) and an outlet part (FAQ91) arranged in the command path. At the inlet part (FEQ91) the status signals required for the monitoring of the command path of the associated switch (Q91) are present. At the outlet part (for example FAQ91) the signal emitted by the associated switch (Q91) to the release units of other switches of the switchgear installation may be obtained. In the release unit the status signals effecting the blocking or release of the switch (Q91) to be monitored are processed.

7 Claims, 4 Drawing Figures

SWITCHING ARRANGEMENT FOR ELECTRICAL INSTALLATIONS

The invention concerns a protective circuit layout for electrical installations with electrical structural parts actuable independently of each other, such as high voltage switchgear with power circuit breakers, disconnecting switches. In such installations and grounding switches, it is customary to report the conditions of structural parts in order to prevent undesirable electrical operating states, and to utilize the status signals of one group of structural parts for the surveillance of the state of a structural part outside the parts comprised in said group.

In high voltage installations these status signals are delivered by means of auxiliary contacts. The contacts of one group of switches of the installation which affect the actuation of a further switch of the installation, are connected with each other in a logic circuit and included in a switch command circuit of the further circuit of the installation. Assurance is thereby obtained that a switch command will be effective only when safe switching is possible. It is thus possible, for example, in switchgear with a separating switch arranged between a bus bar and a power circuit breaker, a separating feeder circuit breaker following the latter and two grounding switches connected with the contact points of the power circuit breaker and each of the separating switches, to ensure that each of the grounding switches may be actuated only when the two separating switches are open. This requires that in the switch command circuit of each of the grounding switches the auxiliary contacts must be connected with each other in a series circuit. Since in a switchgear installation the actuability of a switch generally depends on the switching position of up to 5 further switches of the installation, approximately 3 to 5 auxiliary contacts are needed per switch; and in a three pole switch correspondingly 9 to 15 auxiliary contacts as required. Each of these contacts must be wired in a control panel by means of two leads free of potential and shielded. This involves not only substantial material and installation costs, but because of the difficulty of standardizing switching error protective systems of high voltage switchgear installations and modularizing them, there are also very significant individual engineering costs per installation, arising primarily from the development of individual chains of auxiliary contacts, terminal and auxiliary switch assignments and special wiring diagrams.

It is therefore the object of the invention to provide a protective circuit layout which in particular reduces the manufacturing costs of a high voltage switchgear installation by reducing the number of status report contacts and which, while maintaining high operating safety, offers the possibility of the standardization and modularization of electrical installations with structural parts actuable independently of each other.

This object is attained by providing each structural part of the installation with a modularizable release unit. Status signals for monitoring the command path of the structural part are presented to inlets of the release unit, and signals indicating the state of the part appear at an outlet of the unit. The release unit logically combines the status signals to produce the output signal. The protective circuit layout according to the invention is characterized in that its configurational structure may be modularized and standardized, so that every structural part of the installation, independently of its type and without altering its function, may be preceded by a release unit, the preparation of individual drawings is eliminated, and it is readily programmed, as a single conducting connection to effect a certain connecting condition between two structural parts of the installation is sufficient and this conducting connection may be altered even at the installation site by insertion or by means of screws.

If the protective circuit layout is provided with other features of the invention, in an electrical installation designed as a high voltage switchgear installation a constant number of status signal contacts is required per high voltage switch, generally only two per switch pole, i.e. one for the In and one for the OUT position, and furthermore reliable monitoring may be effected even in the case of a power failure in other power circuits, as long power is available for the switching action itself.

The protective circuit layout embodying a preferred form of the invention is distinguished by a particularly high degree of safety, as all of the release switches involved are tested for satisfactory operation constantly, immediately prior to every switching action, with regard to:

satisfactory pick-up (wire failure) and
satisfactory release (jamming, adherence of contacts).

An eventual failure of a release switch leads to the blocking of commands so that no damage can occur. Furthermore, no permanently attracted release switches are used and the heating and aging of release switches and the unnecessary consumption of power are avoided. For this reason, contactors may be readily used as release switches, the employment of which in actual practice has heretofore been prohibitive in view of the risk of operational interference present in any technical installation and because of the high cost. These contactors are tested immediately upon the entry of a command to ascertain whether they have all been released and only then is the attraction of the contactors, necessary for the switching action and following immediately, effected. In this manner, 100% safety and reliability are obtained. A form of embodiment that may be produced especially in the case of large numbers of the protective circuit layout according to the invention in a particularly cost effective manner may be effected by a printed circuit module configuration.

In the drawing examples of the embodiment of the protective circuot layout according to the invention are represented in a simplified form.

Figure 2:
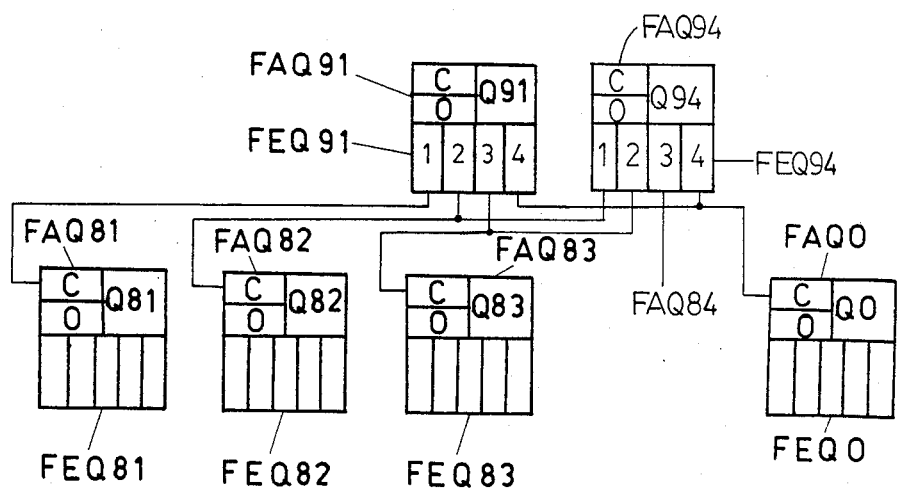
FIG. 2 illustrates a protective circuit layout for the high voltage switch gear installation of FIG. 1, according to the invention, wherein the inlet of a modularized release unit of one of the high voltage circuit breakers is connected with the outlets of the modularized release units of four further high voltage circuit breakers of said installation.
Figure 3:
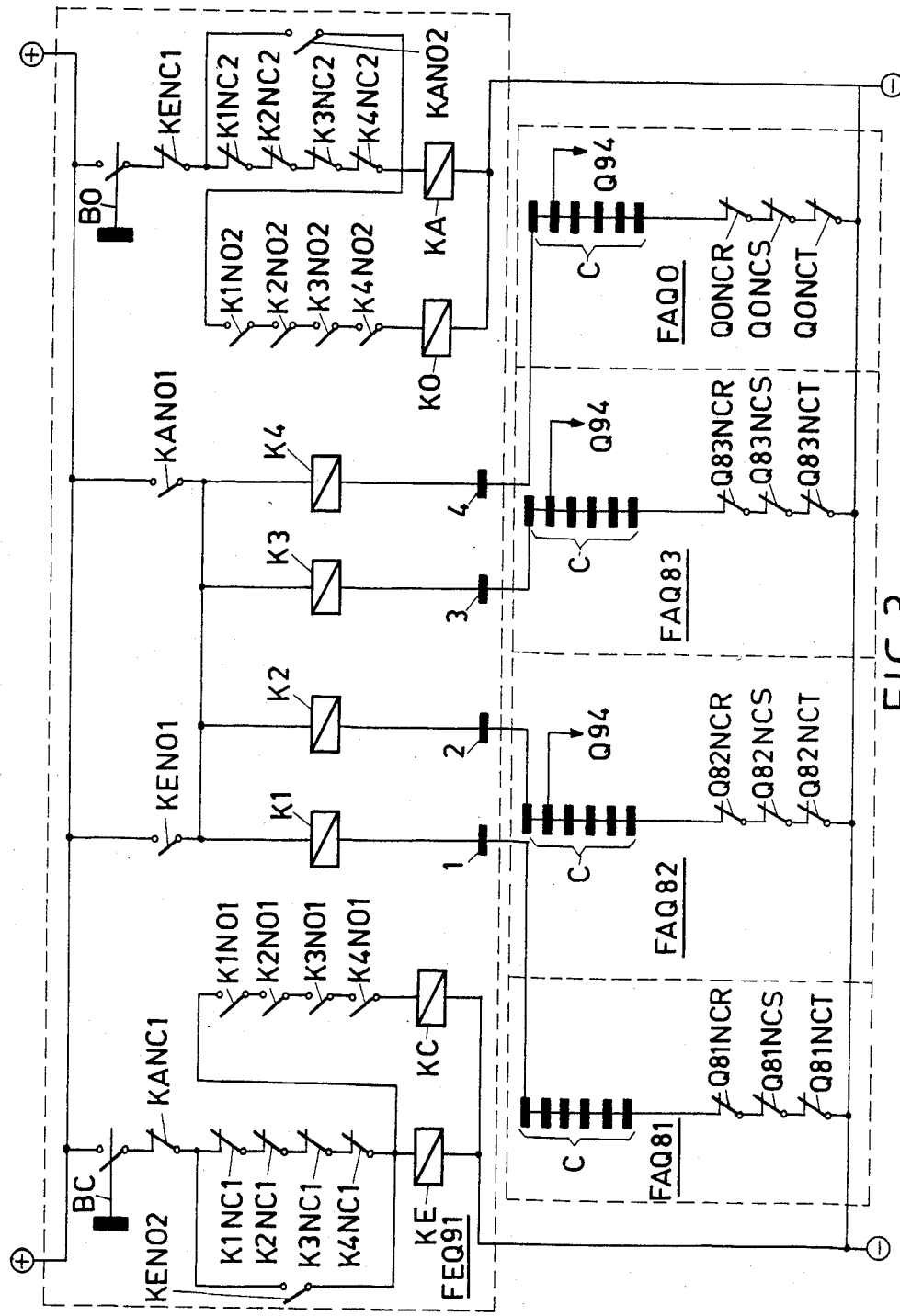
Figure 4:
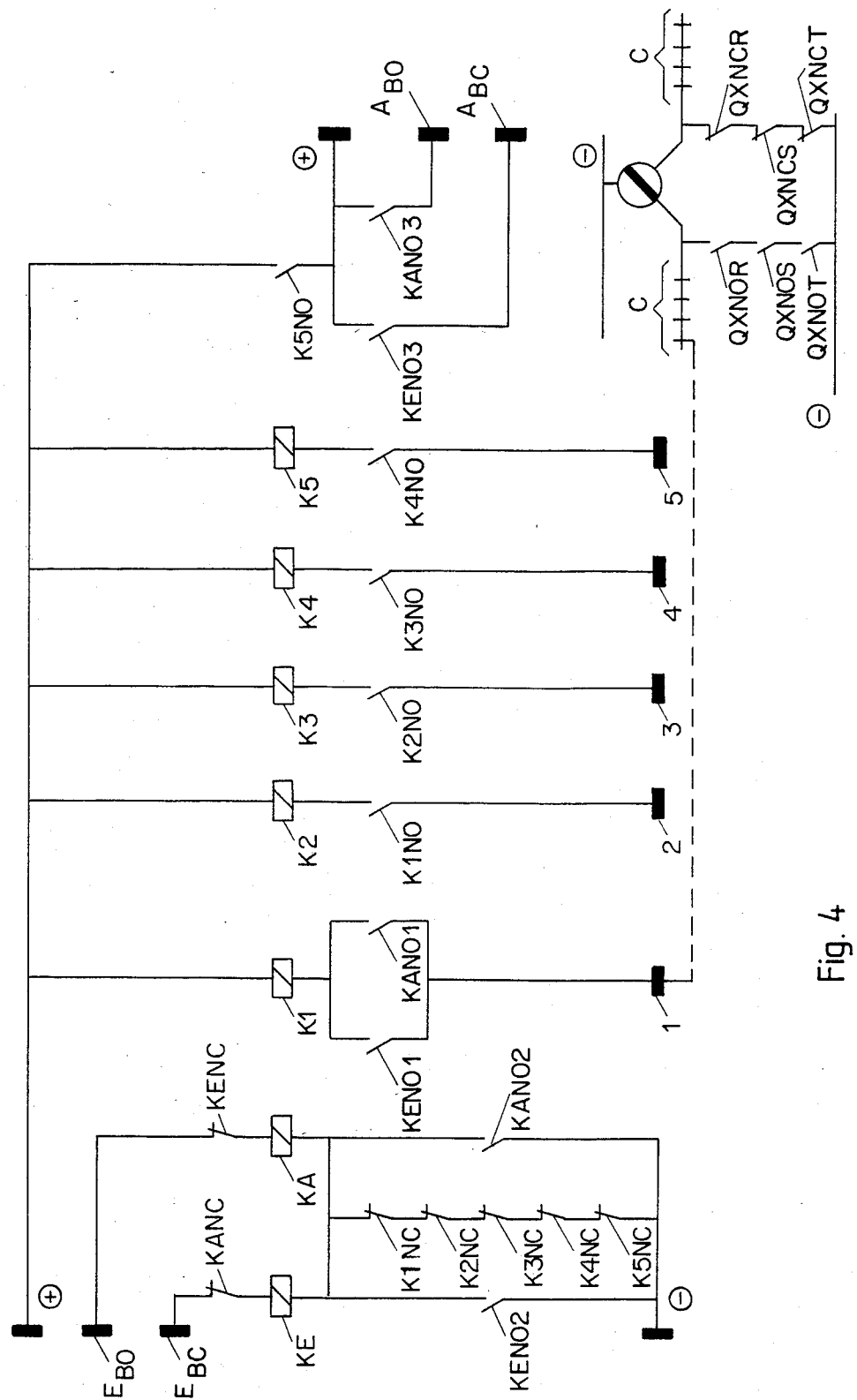

FIG. 3 is a detailed representation of a first form of embodiment of a release unit of the protective circuit layout according to FIG. 2 and FIG. 4 is a detailed representation of a second form of embodiment of a release unit of a protective circuit layout according to the invention, wherein the switching of a high voltage circuit breaker depends on the special blocking conditions of 5 further switches of a high voltage switchgear installation.

Figure 1:
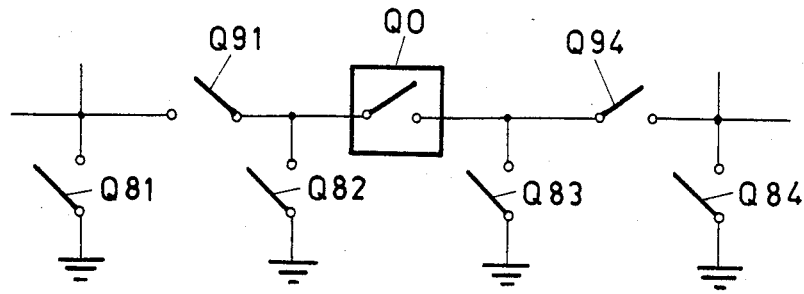
FIG. 1 shows an electric wiring diagram of a part of a known high voltage switchgear installation.

In all of the figures, identical parts are provided with identical reference symbols. FIG. 1 shows an electrical wiring diagram of a part of a high voltage switchgear installation with a power circuit breaker Q0 arranged between two separating switches Q91 and Q94. The two connecting points between the power circuit breaker Q0 and each of the separating switches Q91 and Q94 may be switched to grounding potential by means of the grounding switches Q82 and Q83 and the contacts of the separating switches facing away from the power circuit breaker Q0 are grounded through the grounding switches Q81 and Q84. In such a high voltage switchgear installation for example the separating switch Q91 may be actuated only when the power circuit breaker Q0 and the grounding switches Q81, Q82 and Q83 are open, which in Boolean language may be written as follows:

$$Q91 \subset O Q81 \ Q82 \ Q83 \ Q0$$

In FIG. 2 a protective circuit layout according to the invention is shown, which satisfies the abovecited conditions. In this layout the separating switches Q91 and Q94 to be actuated are provided with modularized release units comprising respectively inlet parts FEQ91 and FE094 and outlet parts FAQ91 and FA094 and the grounding switches and power circuit breakers Q81, Q82, Q83, Q0 controlling the actuation of said separating switch Q91 with modularized release units comprising input parts FEQ81, FEQ82, FEQ83, FEQ0 and outlet parts FAQ81, FAQ82, FAQ83 and FAQ0. The inlets 1, 2, 3, 4 of the inlet part FEQ91 of the release unit of the separating switch Q91 are connected with the outlets C of the outlet parts FAQ81, FAQ82, FAQ83 and FAQ0 of the release units of the grounding switches Q81, Q82 and Q83 and of the power circuit breaker Q0. The outlets FAQ0, FAQ82, FAQ83 and FAQ84 are connected to inlets 1, 2, 3 and 4 of FEQ94. At the outlets C then a status signal may be taken off from a position signal contact, not shown, of the switch involved, if said switch is actuated, whereas at the outlets 0 a status signal may be obtained when the switch involved is deactivated.

In order to satisfy the aforecited conditions for the actuability of the separating switch Q91, all outlets C of the release units of the controlling switches Q81, Q82, Q83 and Q0 are connected to the inlets 1, 2, 3, 4 of the release unit of the separating switch Q91. It is assured thereby in a simple manner that only the signals indicating the state of actuation of the controlling switches Q81, Q82, Q83 and Q0 are arriving in the release unit of the controlled separating switch Q91, wherein they are interconnected logically and release the command path, not shown, of the actuating mechanism of said switch.

In FIG. 3 a release unit of the protective circuit layout explained hereinabove is illustrated in more detail. The release unit associated with the separating switch Q91 comprises in its inlet part FEQ91 outlined by a broken line, a plurality of release switches in the form of contactors, the excitation elements in the form of magnet coils whereof are designated K1, K2, K3 and K4. Each of these release switches has 2 opening (i.e. normally closed) and closing (i.e. normally open) contacts actuated by the same excitation element. The release switch K1 for example has the opening contacts K1NC1 and K1NC2 and the closing contacts K1NO1 and K1NO2. Correspondingly, the release switches K2, K3, K4, respectively, comprise the opening contacts K2C1 and K2NC2; K3NC1 and K3NC2; K4NC1 and K4NC2 and the closing contacts K2NO1 and K2NO2; K3NO1 and K3NO2; K4NO1 and K4NO2. Additionally, in the inlet part FEQ91, two control switches, again in the form of contactors, are provided, comprising the excitation elements KE and KA. Each of these control switches contains three contacts, i.e. two closing contacts and one opening contact. The control switch KE contains the closing contacts KENO1 and KENO2 and the opening contacts KENC1, the control switch KA the closing contacts KANO1 and KANO2 and the opening contact KANC1. Further in the inlet part FEQ91, an actuating switch BC transmitting the actuating command and a relay initiating the closing process of the contacts of the separating switch Q91, with an excitation element KC, and an actuating switch BO transmitting the deactivation command, and a relay directly triggering the opening process of the contacts of the separating switch Q91, with an excitation element KO, are provided. The actuating switch BC, the opening contact KANC1 of the control switch KA, the closing contact KENO2 of the control switch KE, the closing contacts K1NO1, K2NO1, K3NO1 and K4NO1 of the release switches K1, K2, K3 and K4, together with the excitation element KC of the relay triggering the closing process of the contacts of the separating switch Q91, are connecting in series between the poles of a source of direct current and form the actuating command circuit of the separating switch Q91. The actuating switch BO, the opening contact KENC1 of the control switch KE, the closing contacts KANO2 of the control switch KA, the closing contacts K1NO2, K2NO2, K3NO2 and K4NO2 of the release switches K1, K2, K3 and K4, together with the excitation element KO of the relay initiating the opening process of the contacts of the separating switch Q91, are arranged in series between the poles of the source of direct current and form the deactivating command circuit of the separating switch Q91.

In the actuating command circuit, parallel to the closing contact KENO2, a serial circuit of the opening contacts K1NC1, K2NC1, K3NC1 and K4NC1 is provided and parallel to the closing contacts K1NO1, K2NO1, K3NO1, K4NO1 and the excitation element KC, the excitation element KE of one of the two control switches is arranged. Correspondingly, in the deactivating command circuit, parallel to the closing contact KANO2, a serial circuit of the opening contacts K1NC2, K2NC2, K3NC2 and K4NC2, is provided and parallel to the closing contacts K1NO2, K2NO2, K3NO2, K4NO2 and the excitation element KO, the excitation element KA of the other of the two control switches is arranged.

The excitation elements K1, K2, K3 and K4 of the release switches are connected in this order with the inlets 1, 2, 3 and 4 of the inlet part FEQ91 of the release unit of the separating switch Q91 on the one hand, and on the other, by means of the closing contacts KENO1 and KANO1 of the control switches KE and KA with the plus pole of the source of direct current.

The outlet parts FAQ81, FAQ82, FAQ83 and FAQ0, outlined by a broken line, of the release units of the grounding switches Q81, Q82, Q83, respectively, and of the power circuit breaker Q0, comprise three position signal contacts each: Q81NCR, Q81NCS, Q81NCT; Q82NCR, Q82NCS, Q82NCT; Q83NCR, Q83NCS, Q83NCT and Q0NCR, Q0NCRS, Q0NCT, said signal contacts being associated with the phases R, S and T, connected with the minus pole of the source of direct contact, arranged in series and having the configuration of opening contacts. These serial circuits are connected with the outlets C of the outlet parts. The outlets C of the outlet parts FAQ81, FAQ82, FAQ83 and FAQ0 are connected in this order with the inlets 1, 2, 3 and 4 of the inlet part FEQ91 of the release unit of the separating switch Q91.

Each outlet part further contains a serial circuit of three position signal contacts in the form of closing contacts and connected with the minus pole of the source of direct current, each of which is connected with the outlets C of the outlet parts. For the sake of clarity, these contacts are not shown and furthermore they are functionally immaterial in the explanation of the example of embodiment, as the controlling switches Q81, Q82, Q83 and Q0 are emitting status signals in the actuating position, i.e. with the position signals closed, only.

The outlets C of the outlet parts are further connected with other release units. Thus for example the outlets of FAQ82, FAQ83 and FAQ0 with the release unit of the separating switch Q94.

The circuit layout functions in the following manner:

An actuating command must pass through the opening contacts KANC1 and K1NC1, control switches. This only occurs when no contrary command (command to open switch 91) is standing at the switch Q91 and when excitation element KA is de-energized causing switches KANO1, KANO2 and KANC1 to return to their normal positions and when further excitation elements K1, K2, K3 and K4 are de-energized causing the associated switches to return to their normal positions. If this is the case, the open opening contact. If the control switch and the 4 release switches drop out, the excitation element KE, in the form of a coil, is energized and the control switch involved goes into a locking position upon an actuating command, which signifies that the opening contact KENC1 is open (deactivating command circuit interrupted) and the closing contacts are closed. Because of the closed contact KENO1, now all of the excitation elements K1, K2, K3 and K4 of the release switches are connected with the plus pole of the source of direct contact.

Of these excitation elements K1, K2, K3 and K4 only those are also connected with the minus pole of the source of direct current which are connected with the release outlet of one of the switches Q81, Q82, Q83 and Q0, the position signal contacts whereof, for example Q81NCR, Q81NCS, Q81NCT are in the necessary switching position for all three phases R, S, T. In the example of embodiment this means that K1, K2, K3 and K4 are excited when all switches Q81, Q82, Q83 and Q0 and thus all position signal contacts Q81NCR, Q81NCS, Q81NCT, Q82NCR, Q82NCS, Q82NCT, Q83NCR, Q83NCR, Q83NCS, Q83NCT, Q0NCR, COCS and Q0NCT, are closed.

The closing contacts K1NO1, K2NO1, K3NO1 and K4NO1 of the release switches are closed, the opening contacts K1NC1, K2NC1, K3NC1 and K4NC1 are open and the actuating command arrives through the opening contact KANC1 and the closing contacts KENO2, K1NO1, K2NO1, K3NO1 and K4NO1 to the excitation element KC of the trigger relay initiating the actuation of the separating switch Q91.

If a single release condition at one of the four switches Q81, Q82, Q83 and Q0 is not satisfied or not all three of the position signal contacts connected in series of the three phases to be switched by the corresponding switch are in the required and identical position, the corresponding release switch remains off and the communication of the actuating command to the trigger relay KC is blocked. The separating switch Q91 then remains locked.

The mode of operation of the circuit layout is correspondingly similar when a deactivating command is issued by the actuation of the activating switch BO.

In the example of embodiment described hereinabove the actuation and deactivation of the separating switch Q91 was considered only as a function of the specific locking conditions of 4 further switches Q81, Q82, Q83 and Q0 of a high voltage switchgear installation. By means of different circuits of the closing contacts K1NO1, K2NO1, K3NO1 and K4NO1 and respectively K1NO2, K2NO2, K3NO2 and K4NO2 of release switches in the actuating and deactivating command circuits, all imaginable other locking conditions may be realized. Furthermore, depending on the number of controlled switches, more or less than four release switches may be provided in the release unit of the controlled switch. The release and control switches preferably have the configuration of contactors. In large series, it is advisable to design the release units as printed series modules. This may be effected independently of the type of the high voltage switchgear involved.

In FIG. 4 a second form of embodiment of a release unit of a protective circuit layout according to the invention is shown, wherein the actuation and deactivation of a switch, not shown, is effected as a function of 5 further switches, of which only release outlet of the switch QX is shown. In this embodiment, $E_{BC}$ and $E_{BO}$ and respectively $A_{BC}$ and $A_{BO}$ designate the inlets and outlets for the actuation and deactivation commands. The inlets $E_{BC}$ and $E_{BC}$ may be connected with an actuating switch BC or BO, not shown, transmitting the actuation and deactivation commands, while the outlets $A_{BC}$ and $A_{BO}$ may be connected with a trigger element KE, not shown, for the actuation, and with a trigger element KA, not shown, for the deactivation of said switch.

The release unit contains 5 release switches in the form of contactors, the excitation elements whereof designed as magnet coils, are designated K1, K2, K3, K4 and K5. Each of these release switches has a closing and an opening contact actuated by the same excitation element. The switch with the excitation element K1NO comprises the closing contact K1NO and the opening contact K1NC and correspondingly the switch with the excitation element K2 the closing contact K2NO and the opening contact K2NC, the switch with the excitation element K3 the closing contact K3NO and the opening contact K3NC, the switch with the excitation element K4 the closing contact K4NO and the opening contact K4NC and the switch with the excitation element K5 the closing contact K5NO and the opening contact K5NC. Beyond this, two control switches, again in the form of contactors, with the excitation elements KE and KA are provided. Each of these control switches contain 4 contacts, i.e. three closing contacts and one opening contact, actuated by the excitation element. The switch with the excitation element KE serves as the actuating control switch and has the three closing contacts KENO1, KENO2 and KENO3, together with the opening contact KENC. The switch with the excitation element KA serves as the deactivating control switch and comprises the closing contacts KANO1, KANO2 and KANO3, together with the opening contact KANC.

The inlets $E_{BC}$ and $E_{BO}$ respectively, are connected individually by means of a serial circuit of the opening contact KANC and the excitation element KE and respectively the opening contact KENC and the excitation element KA, with a common connection point, which may be connected to a negative potential by means of three parallel branch currents comprising in order respectively the closing contact KENO2, the closing contact KANO2 and a serial circuit of the opening contacts K1NC, K2NC, K3NC, K4NC and K5NC.

An inlet that is not designated, for the plus potential, may be connected through the closing contact K5NO with a connecting point, which in turn is connected through one of the three branch currents directly with an outlet for the plus potential, not designated, or respectively through the closing contact KENO3 with the outlet $A_{BC}$ for the actuating signal or respectively through the closing contact KANO3 with the outlet $A_{BO}$ for the deactivating signal. All of the excitation elements K1, K2, K3, K4 and K5 of the release switches may be connected on one side with the plus potential and on the other successively through the parallel connected closing contacts KENO1 and KANO1, the closing contact K1NO, the closing contact K2NO, the closing contact K3NO and respectively the closing contact K4NO, with the release outlets 1, 2, 3, 4 and 5. A status signal of five logically interconnected status signals is standing at each of the release inlets, which are emitted by the release outlets C of five high voltage switches of the switchgear installation.

In the figure, for reasons of clarity, only the release inlet 1 of the release unit is shown connected with a release outlet C for a switch QX, the position of which is reported by means of position signal contacts, which in the actuating state may consist of the opening contacts QXNCR, QXNCS, QXNCT and in the deactivated state the closing contacts QXNOR, QXNOS, QXNOT.

The layout functions in the following manner:

In case of an actuating command, the inlet $E_{BC}$ is connected by means of a switch BC, not shown, with a phase potential. The excitation element KE of one of the two control switches is energized, when the opening contacts KANC, K1NC, K2NC, K3NC, K4NC and K5NC are closed. This only occurs when no contrary command is standing at the switch and the control switch with the excitation element KA has dropped off and when further all of the release switches are off. The control switch with the excitation element KE may now be activated and the three closing contacts KENO1, KENO2 and KENO3 are closing.

If KENO1 is closed, the excitation element K1 of the first of the release switches may be activated, provided that the status signal of the high voltage circuit breaker QX necessary for the actuating process is standing at the release inlet 1 of the release unit. In this case K1NC opens and K1NO closes.

Following the opening of K1NC, the current flowing through the excitation element KE of one of the control switches is now conducted exclusively through the branch with the closed contact KENO2, while the closing of K1NO effects a current flow through the excitation element K2 of a second of the release switches, if the necessary status signal from a further high voltage circuit breaker is standing at the inlet 2.

The same is true correspondingly for the excitation elements K3, K4 and K5 of the remaining release switches, which following the successive testing of the release conditions are energized in steps. Following the excitation of the element K5, K5NO is closed, with the consequence that a plus potential is standing at the outlet $A_{BC}$, whereby the trigger element, not shown, of the high voltage circuit breaker may be actuated.

The layout operates correspondingly during deactivation.

The layout described hereinabove has the following additional advantages with respect to the configuration shown in FIG. 3:

the number of contacts required by the release switches (contactors) is cut in half, and
the wiring effort is reduced.

I claim:

1. A protective circuit layout for a high-voltage switchgear installation comprising a plurality of high-voltage switches and a plurality of modular release units, each release unit being associated with only one of the switches, each release unit comprising at least one position signal contact indicating the switching position of the high-voltage switch associated with the release unit;

a first group of the modular units each having an output means operatively connected to said at least one position signal contact and to an input means of each of a second group of said modular release units of said high-voltage switchgear installation;

said second group of said modular units each including release switches, each of which comprises an excitation element and at least one normally-open contact; and each of said input means being operatively connected to a single one of the excitation elements of said release switches and to the output of a single one of the first group of modular release units of said high-voltage switchgear installation;

wherein at least one of said normally-open contacts of said release switches of one of the modular release units of said second group is operatively connected to an excitation element of the high-voltage switch associated therewith; and wherein said normally-open contacts of said release switches of said one of the second group of modular release units are connected in a manner to accomplish a logic combination of signals fed from position signal contacts of the first group of modular release units of the high-voltage switches to the inputs of said one modular release unit.

2. The protective circuit layout of claim 1 wherein said normally-open contacts are connected in series with said excitation elements.

3. The protective circuit layout of claim 1 wherein the normally-open contact of one release switch is connected in series with the excitation element of a second release switch.

4. The protective circuit layout of claim 3 wherein the normally-open contact of said second release switch is connected in series with the excitation element of a third release switch.

5. The protective circuit layout of claim 1 wherein said release switches further include normally-closed contacts connected in series, and said release unit includes a control switch having an excitation element connected in series with said normally-closed contacts.

6. The protective circuit layout of claim 5 wherein said control switch has a first normally-open contact connected in series with the excitation element of at least one of said release switches and a second normally-open contact connected in parallel with said series connected normally-closed contacts.

7. The protective circuit layout of claim 6 wherein said control switch has a third normally-open contact operatively connected to a excitation element for actuating said high-voltage switch.

* * * * *